(No Model.) 2 Sheets—Sheet 1.
C. CHAMBERS, Jr.
TRANSFER CAR.
No. 493,976. Patented Mar. 21, 1893.
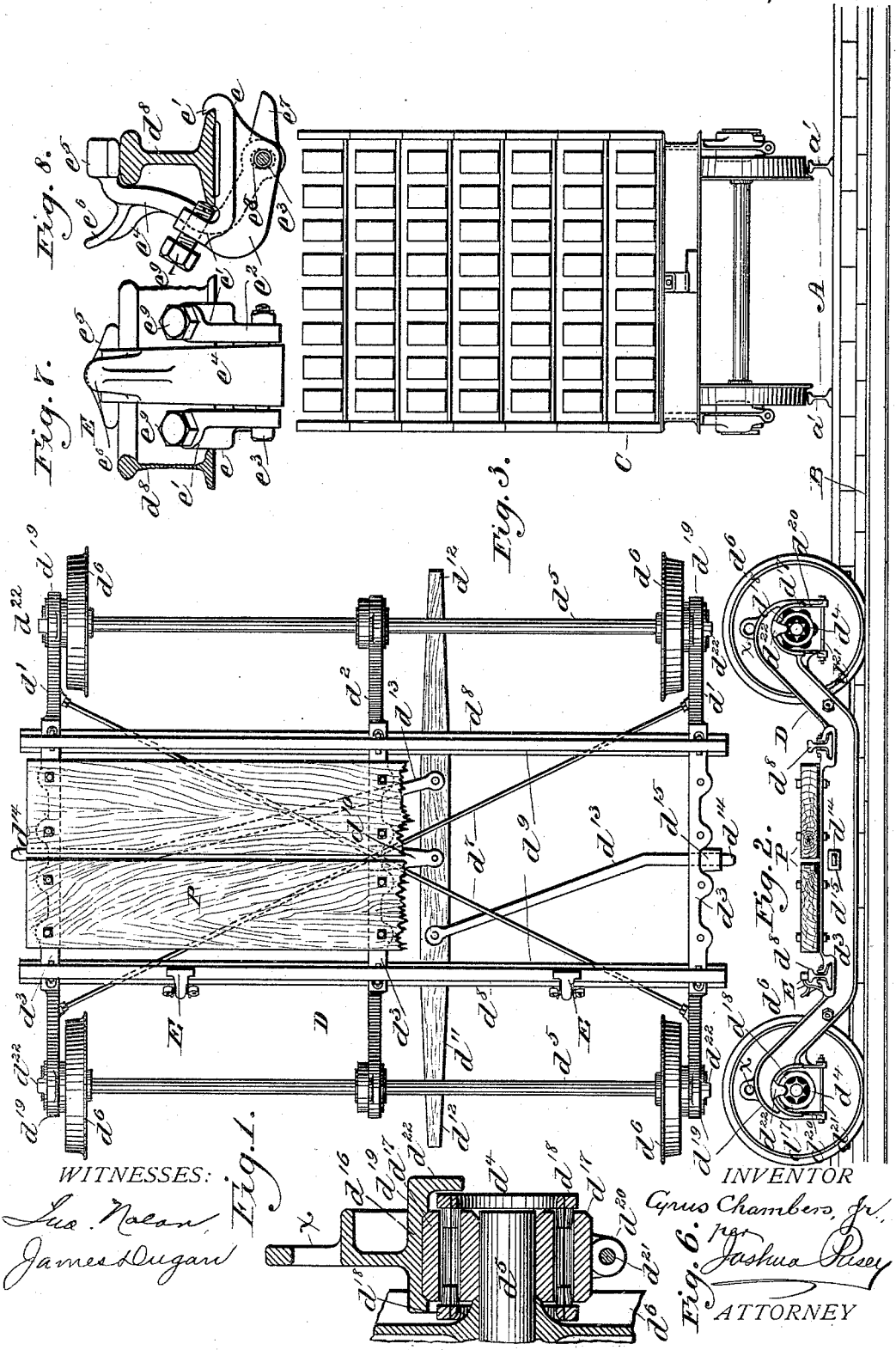
WITNESSES:
INVENTOR
Cyrus Chambers, Jr.
per
Joshua Pusey
ATTORNEY

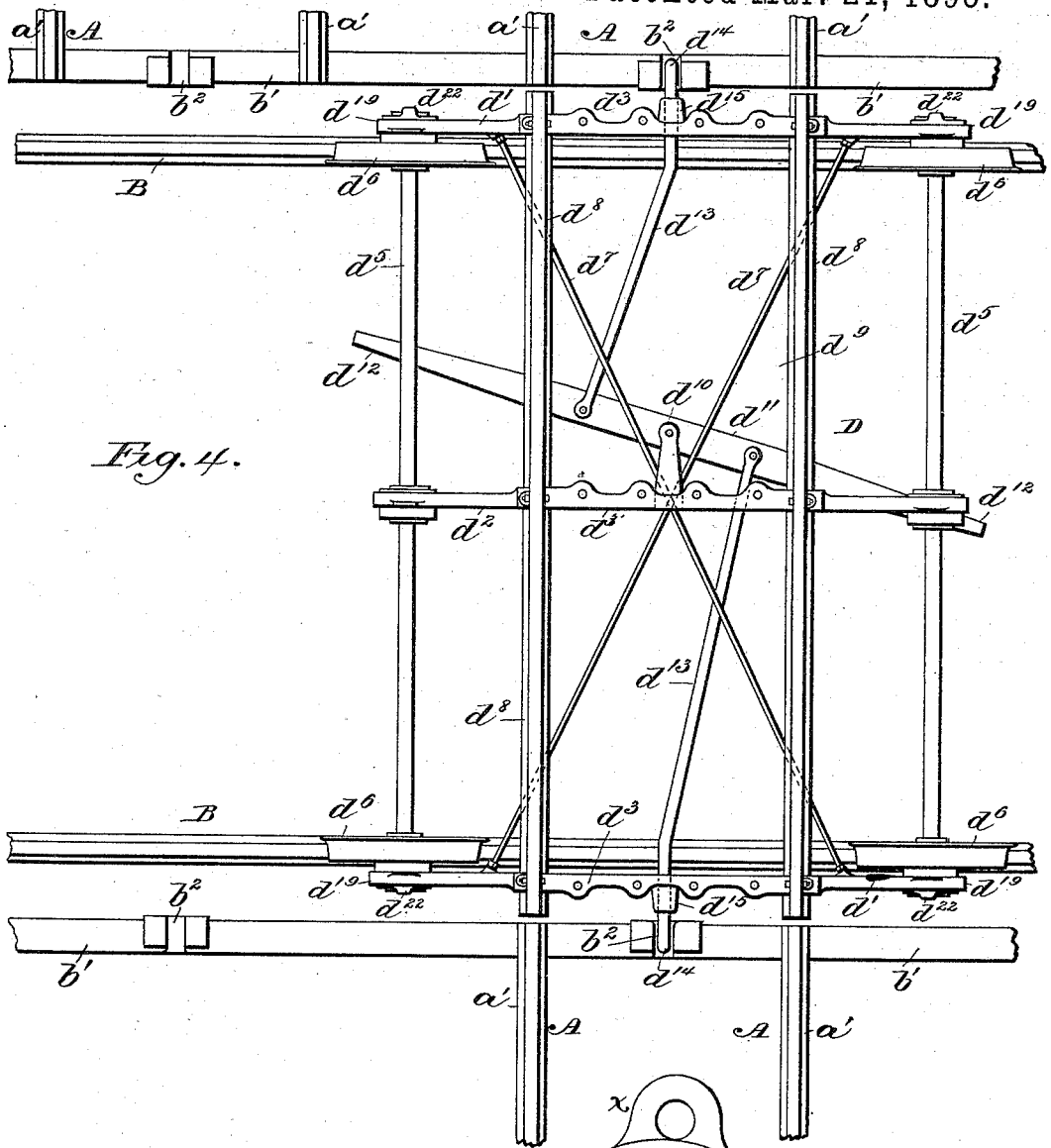
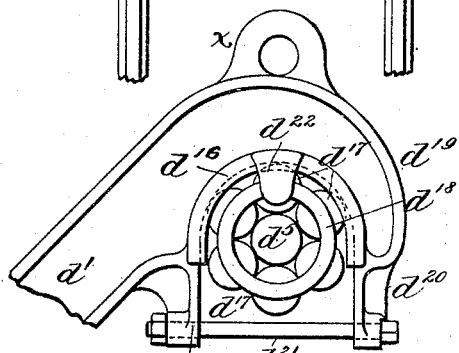

UNITED STATES PATENT OFFICE.

CYRUS CHAMBERS, JR., OF WYNNEWOOD, ASSIGNOR TO THE CHAMBERS BROTHERS COMPANY, OF PHILADELPHIA, PENNSYLVANIA.

TRANSFER-CAR.

SPECIFICATION forming part of Letters Patent No. 493,976, dated March 21, 1893.

Application filed September 8, 1888. Serial No. 234,850. (No model.)

*To all whom it may concern:*

Be it known that I, CYRUS CHAMBERS, Jr., a citizen of the United States, residing at Wynnewood, in the county of Montgomery and State of Pennsylvania, have invented certain new and useful Improvements in Transfer-Cars, of which the following is a full, clear, and exact description, reference being had to the accompanying drawings, of which—

Figure 1, Sheet 1, is a plan view of the car, part of the platform being broken away to more clearly show the locking bolts and connections, which are represented in the position which they occupy when the car is unlocked. Figs. 2 and 3 are side and end views of said car and the "drier" car, respectively, showing the relative positions of the cars and their tracks. Fig. 4, Sheet 2, is a plan view of the transfer car locked in position, the platform being removed therefrom, and the locking devices and tracks clearly shown. Fig. 5 is a front view, enlarged, of one of the roller journal boxes, and adjuncts. Fig. 6, Sheet 1, is a vertical section through Fig. 5. Figs. 7 and 8 are front and end views, respectively, of the pivoted stop device, showing the same in locking position.

This invention relates to that class of wheeled trucks, or "transfer cars," which are used for shifting or transferring brick "drier" or other cars from one point to another; the transfer car being adapted to travel upon a track disposed transversely to, and below the ends of, a series of tracks which are located at different points in the yard, &c., and upon which tracks run the drier cars, and said transfer car being provided with a track on its upper surface, in the same plane as, and parallel with, said series of tracks, whereby when the transfer car is moved so as to bring the track thereon in line with one of the main tracks, the drier car, or cars, upon the latter may be run onto said track on the transfer car, whereupon the latter, with the drier car thereon, may be shifted to another of the main tracks and the drier car transferred to said other track.

The object of my invention is to improve the general construction of transfer cars of this class; to provide devices whereby said cars may be readily and securely locked in proper position with reference to the main tracks; to provide means whereby the drier car may be held in place on the transfer car, when run thereupon; and to provide means whereby displacement of the roller journal boxes will be prevented when either end of the transfer car is raised up or tilted.

The invention accordingly consists in such improved construction, means and devices, and also in certain details which will be hereinafter explained and definitely claimed.

Referring to the annexed drawings, A represents a series of tracks arranged at different points—near or distant—in the brick-yard, or elsewhere; and B, a single track disposed near the ends of, at right angles to, and below, said tracks.

C represents a drier car adapted normally to run on the tracks A; and D, a transfer car, or truck, adapted to run on the track B. The main framing of this transfer car is composed of three equidistant parallel bars, $d'$, $d'$, $d^2$, each of which is depressed at a point, $d^3$, between its ends. The outer bars, $d'$, carry, or bear against, boxes, $d^4$, for the journals of the axles, $d^5$, which support the wheels, $d^6$, said axles passing through the perforated ends of the other or middle bar $d^2$. The bars, $d'$, also bear against the hubs of the wheels, as seen, and are connected with each other and with the middle bar by means of two crossed diagonal braces, $d^7$. By this construction the axles are firmly supported and prevented from springing out of line, and the truck, as a whole is made stiff and rigid.

Secured to and extending across the framing, at each side of the depressions, $d^3$, are rails, $d^8$, which are in the same plane as the rails, $a'$, of the tracks A. The track, $d^9$, formed by the rails, $d^8$, is parallel to, and of the same gage as said tracks A. Between these rails $d^8$, I construct a platform, P, which consists of a board or boards laid across and bolted to the bars $d'$, $d^2$. This platform not only braces the car, but serves as a convenient means whereby the operator may pass from one side to the other of the car, or across the track, when necessary. As the track, $d^9$, on the transfer car D, is on the same plane as the side tracks, A, it will be seen that, when the said track $d^9$ is brought opposite one of these side tracks, a car, C, loaded or not with bricks, or other material, may be readily run from the side track upon the track $d^9$, and that the car D, with the loaded or unloaded car thereon may be shifted into the same position with reference to another side track, and the car C transferred to said latter track.

In order that the transfer car may be held in proper position relative to the side track, while loading or unloading the car, I provide the following locking mechanism: Pivoted in a lug, $d^{10}$, in the center of the car D, below the rails, $d^8$, is a lever $d^{11}$, to each arm, $d^{12}$, of which is pivoted one end of an arm, $d^{13}$, whose free extremity, $d^{14}$, slides in a socketed boss, $d^{15}$, in the middle of the adjacent end bar $d'$, and constitutes a bolt. Secured along the ends of the tracks A, parallel with the track B, are iron plates or bars, $b'$, which are provided, at opposite points therein, at the middle of each track A, with sockets or recesses, $b^2$, into which the bolts, $d^{14}$, are adapted to enter, and thus lock the car in position. By means of the extended arms, $d^{12}$, of the lever, the operator is enabled, from either side, to readily lock or unlock said car; and, as the bolts $d^{14}$ are arranged on both sides of the car, the latter may be locked, at each side thereof, in line with any side track or tracks desired.

When it is required to transfer or run a drier car from one of the side tracks upon a track on the opposite side of the transfer pit, the car D is locked and held rigidly in line with both said tracks, as seen in Fig. 4, and the drier car run across the track $d^9$ on the transfer car.

Each of the journal boxes $d^4$ consists of a series of bevel-edged rollers, $d^{17}$, journaled around and between two connected rings, $d^{18}$, in the usual manner, thus forming what is termed a "cage," and over and upon these rollers loosely rests the beveled flanged end, $d^{19}$, of the bar $d'$, which end is provided with depending arms, $d^{20}$, that embrace the rollers. These arms are connected at their extremities by means of a pin or bolt, $d^{21}$, which keeps the cage from dropping entirely out of its recess when the car is tilted or lifted. In order to guard against the cages, when the car is so tilted or lifted, becoming displaced upon the axle journal or shifting so that the rollers will not slip back into their places in the beveled recessed flanges or boxes, $d^{16}$, in which they roll, I provide the ends of each bar $d'$ with projecting fingers, $d^{22}$, which extend down in front of the adjacent cages, as clearly shown. On the ends of said bars $d'$ are also formed perforated lugs, $x$, through which may be inserted a hook, or hooks, by which to draw or push the car.

As a ready means to hold the drier car in position upon the transfer car, when shifted upon the latter, I provide one of the rails of said transfer car, at proper points thereon, with swinging stops E, which are constructed and adapted to operate as follows, reference being had more particularly to Figs. 7 and 8: $e$ is a small casting which is provided with end lugs, $e'$, that are so formed as to slip under and embrace the base of one of the rails, $d^8$, and with side lugs, $e^2$, through which extends a bolt, $e^3$, that forms a pivot for a curved arm $e^4$. The casting $e$ is adjustably secured to the rail by means of set-screws $e^9$, which work in the outer end-lugs and take against the base of the rail, as clearly seen. The arm $e^4$ is bent upward and is provided with a beveled head, $e^5$, at its upper end, which may be thrown over upon the rail, as shown. The arm $e^4$ is also provided, near the top, with a stud or projection, $e^6$, by which to readily throw the head on and off the rail, as required, and at its lower end with a projection, or arm, $e^7$, which limits the motion of the arm, $e^4$, when the head or stop is thrown off the rail. In order that said head may rest solidly upon the top of the rail I make the holes, $e^8$, in the lugs, $e^2$, slightly elongated vertically, as shown by the dotted lines in Fig. 8. One of these stop devices is disposed at each end of the rail, $d^8$, and is normally out of engagement therewith, but when the drier car is run upon the track $d^9$, said stops are thrown over upon the rail, thus abutting against the wheels of the drier car, and preventing displacement of the latter. By making these stops adjustable, by means of the set-screws, as described, they, the stops, may be readily set to proper positions on the rails of transfer cars of various dimensions.

Having thus described my invention, I claim as new and wish to secure by Letters Patent—

1. In a car of the class recited, the combination of the depressed side bars, the middle bar, the axle extending through said middle bar, and journaled in boxes, or bearings, at the ends of said side bars, the wheels on said axles, and the track supported by said bars, substantially as and for the purpose set forth.

2. In a transfer car, the combination of the depressed side bars, the middle bar, the axle extending through said middle bar, and journaled in boxes, or bearings, at the ends of said side bars, the wheels on said axles, and the track supported by said bars, together with the brace rods, substantially as and for the purpose set forth.

3. The combination with the tracks A and B, and the socketed plate, or plates, adjacent to, and parallel with, said latter track, of the transfer car, consisting of a wheeled frame, or truck, provided with a track, $d^9$, thereon, the sliding bolt, or bolts, in the side, or sides, of said car, and means, such as the pivoted lever, for engaging and disengaging said bolt, or bolts, with and from the socketed plate, or plates, all constructed, arranged with relation to each other, and adapted to operate substantially as and for the purpose set forth.

4. The combination with the tracks A and B, and the socketed plate, or plates, adjacent to, and parallel with, said latter track, of the transfer car, consisting of a wheeled frame, or truck, provided with a track, $d^9$, thereon, the centrally-pivoted lever, the arm pivoted thereto and working in the sides of the car, all constructed, arranged relatively, and adapted to operate substantially as and for the purpose set forth.

5. The combination of the connected side bars, the roller journal boxes at the ends thereof, embraced by said bars, the fingers projecting from said bars down in front of said boxes, the axles journaled in the latter, and the wheels, substantially as described.

6. The combination with the wheeled frame or truck, of the bevel edged rollers, the frame in which the same are journaled, the beveled flanged box, $d^{16}$, the depending arms, $d^{20}$, the bolt or pin connecting said arms, and the finger for retaining said roller-frame within the box $d^{16}$, substantially as and for the purpose described.

7. The combination with the rail, of the base plate secured thereto, and provided with the depending lugs, the curved lever arm pivoted in and between said lugs and provided with the rearward stop or projection which is adapted to impinge against the under side of said base plate when the lever arm is thrown away from the tread of the rail, substantially as described.

8. The combination with the rail, of the base plate provided with the rail embracing lugs and with the depending pivot lugs, the curved lever arm pivoted in and between said latter lugs, and provided with a suitable back stop or projection, and the set screw or screws adapted adjustably and detachably to secure said plate to the rail, substantially as described.

9. The combination with the rail, of the base plate secured thereto and provided with the depending lugs on its under side, the pivot pin or bolt extending through the vertically elongated holes in said lugs, the curved lever arm mounted on said pin or bolt, and provided with the head or shoe, which is adapted to be swung upon or away from the tread of the rail, substantially as described.

10. The combination with the rail, of the base plate provided with the rail embracing lugs, with the depending pivot lugs and with the outer screw receiving lugs, the curved lever arm pivoted in and between said depending lugs, and provided with a stop or projection which is adapted to take against the base plate when the lever is swung away from the rail, and the set screws adapted to work in said receiving lugs and act against the rail, substantially as described.

In testimony whereof I have hereunto affixed my signature this 29th day of August, A. D. 1888.

CYRUS CHAMBERS, JR.

Witnesses:
MARY P. CHAMBERS,
HELEN CHAMBERS.